United States Patent [19]

Kawasaki et al.

[11] 4,206,621
[45] Jun. 10, 1980

[54] METHOD OF MAKING A WOUND ARMATURE CORE STRUCTURE

[75] Inventors: Kenzo Kawasaki, Kariya; Shiuichi Itamoto, Chiryu, both of Japan

[73] Assignee: Nippondenso Co., Ltd., Kariya, Japan

[21] Appl. No.: 946,372

[22] Filed: Sep. 27, 1978

[51] Int. Cl.² ...................... H01F 3/04; H02K 15/00; B21D 11/06
[52] U.S. Cl. ...................... 72/130; 29/596; 29/605; 29/609; 72/137
[58] Field of Search ............... 29/596, 605, 609; 72/135, 137, 142, 145, 130, 131, 132; 113/119

[56] References Cited

U.S. PATENT DOCUMENTS

| 2,304,607 | 12/1942 | Sleeter | 29/596 |
| 2,711,008 | 6/1955 | Smith | 29/605 X |
| 3,225,424 | 12/1965 | Wiley | 29/605 |
| 4,080,724 | 3/1978 | Gillette | 29/596 X |
| 4,116,033 | 9/1978 | Iwaki et al. | 72/142 |

FOREIGN PATENT DOCUMENTS 2461695  7/1975  Fed. Rep. of Germany ............. 29/596

Primary Examiner—Ervin M. Combs
Attorney, Agent, or Firm—Cushman, Darby & Cushman

[57] ABSTRACT

A method of making a laminated armature core for a small electric motor is disclosed.

In a longitudinal metal strip, a couple of comb-like ribbons having teeth and slots with teeth of one ribbon being complementary to slots of the other are formed. A U-shaped groove is formed on each edge of the teeth. After edge-winding the ribbon, the U-shaped grooves are spread to form shoes extending transversely to the longitudinal axis of the teeth.

6 Claims, 5 Drawing Figures

METHOD OF MAKING A WOUND ARMATURE CORE STRUCTURE

BACKGROUND OF THE INVENTION

The present invention relates to a laminated armature core structure which has comparatively less number of slots and longer teeth generally used for a small electric motor such as a windshield motor for a vehicle. The armature core used for such a small motor has substantially large slot area relative to the whole area of the core. Conventional method of making such core sheets or laminated core structure such as disclosed in U.S. Pat. No. 3,225,424 would merely remove the material from the slot area with a resultant substantial waste of material.

SUMMARY OF THE INVENTION

Therefore, the main object of the present invention is to provide an improved method of making a wound laminated armature core structure of less waste material.

Another object of the present invention is to provide an improved method of making a laminated core structure in which the arc length of tooth edge may be freely varied according to the size and characteristics of an electric motor.

Other objects and advantages will be readily apparent from the following description and drawings.

DESCRIPTION OF THE PREFERRED EMBODIMENT

Figure 1:
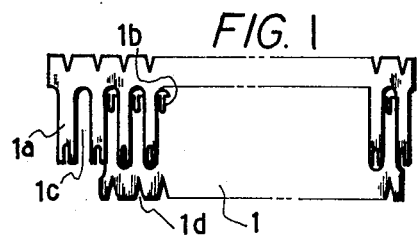
FIG. 1 shows a couple of comb-like core bands formed on a single metal strip according to the present invention.
Figure 2:
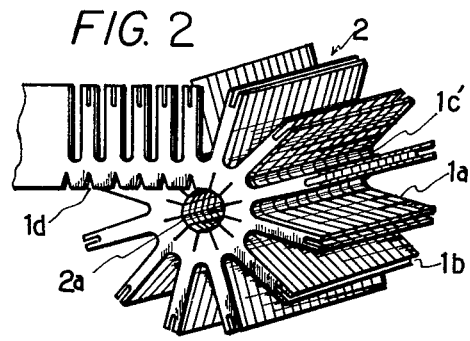
FIG. 2 shows a spiral core stack of a comb-like core band shown in FIG. 1.
Figure 3:
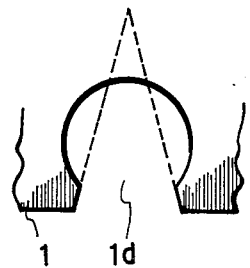
FIG. 3 shows a partially enlarged view of a modified notched portion according to the present invention.

As shown in FIG. 1, a longitudinal metal is press-cut to form a couple of comb-like steel core bands 1. The core band 1 has a plurality of teeth 1a each having a longitudinal groove 1b and slots 1c alternatively at one edge and a plurality of notches 1d at the other edge respectively spaced at equal intervals. The depth of the groove is determined by the teeth length and other factors relative to machine characteristics. The couple of steel core bands 1 are separated and each core is respectively bent and spirally wound so that the teeth extend radially outwardly, as shown in FIG. 2, until it becomes a spiral core stack 2 of a predetermined height. The core band 1 may be wound on a spool or an arbor having diameter slightly greater than the shaft to be fitted thereto, with its one end anchored to the spool. As the core band 1 is wound, the slot 1c forms a triangular slot 1c', to which a sprocket may be applied to rotate the core stack for further winding or to line up the teeth 1b over the stack. In this step, opposite walls of the notches are compressed to contact each other and the core material between notches forms inner periphery of a shaft receiving bore 2a. To ensure good magnetic permeability of the core, edge portion of the notch is preferably formed round, to make the contacting portion or discontinuous magnetic path of the core sheet shorter as possible as shown in FIG. 3. When the spiral core stack 2 comes to have a predetermined height, the metal strip 1 is cut.

Figure 4:
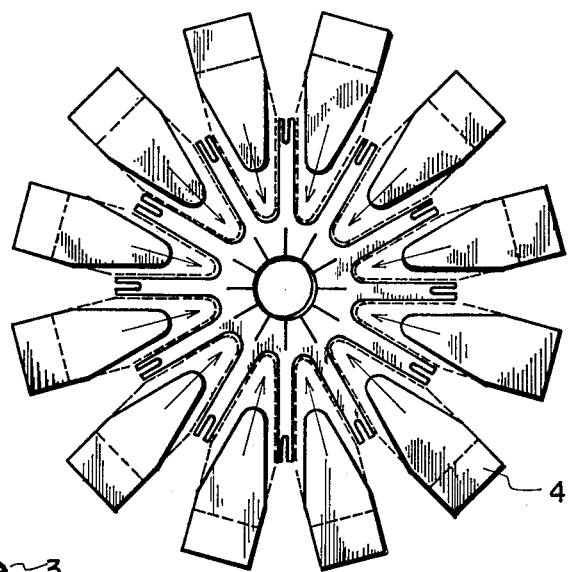
FIG. 4 shows an example of shaping the core stack shown in FIG. 2.
Figure 5:
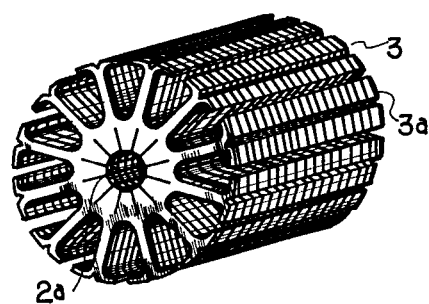
FIG. 5 shows a finished core structure according to the present invention.

In order to ensure good press-fitting of a shaft into the shaft receiving bore 2a, the diameter of the bore 2a is preferably made greater than that of the shaft and is, thereafter, compressed to reduce its diameter as shown in FIG. 4. In the above compression step, the shaft or an arbor having the same diameter as the shaft is inserted into the shaft receiving bore 2a and wedge like members 4 are applied into the slots 1c' to compress their bottom from the outside. The periphery of the wedge like member is preferably the same in shape as the slot 1c' so that all the core sheets of the spiral core stack 2 may conform to each other. After comforming, the core stack 2 is solidly fixed by welding, preferably, the bottom surface of the slots 1c' over the length of the core stack. Thereafter, the grooves 1b of the teeth 1a are spread out in a known manner to form arcuate shoes or tooth edges 3a forming circular peripheral surface of a core structure 3 as shown in FIG. 5. Such a spreading step may be attained by inserting wedge like tools having different edge angles in to the groove successively. The arc length of the shoe 3a can be readily varied by changing the depth of the groove 1b. In other words, the arc length is not restricted by the width of the slot 1c formed in a metal strip 1. The core structure can be obtained in another manner. That is, the core band 1 may be cut before it is wound. In this case, cutting step after the winding, of course, may be eliminated.

To the shaped or reduced shaft receiving bore, press-fitted a shaft having serrated peripheral surface and, thereafter, conductors and insulators are put into the slots 1c' in a known manner.

What is claimed is:

1. A method of making a wound armature core structure having evenly spaced teeth, said core being adapted for use in a rotary electric machine, the method comprising the steps of:
   notching opposite edges of an elongated metal strip at evenly spaced intervals,
   zigzagly cutting the metal strip at evenly spaced intervals intermediate its edges in a longitudinal direction of the strip to form a pair of comb-like ribbons each having alternating teeth and slots with the teeth of one ribbon being complementary to the slots of the other,
   forming a U-shaped groove at a free end of each of the teeth, each groove extending along the longitudinal axis of its respective tooth,
   separating the pair of comb-like ribbons,
   spirally winding one of the ribbons to form a generally cylindrical laminated body with the edge of the strip defining an internal bore and the teeth extending radially from said body at equally spaced intervals and
   spreading each of the U-shaped grooves such that the portions of each tooth separated by a groove extend in opposite directions substantially transversely to the longitudinal axis of the respective tooth to thereby form a core shoe.

2. A method of making a wound armature core structure according to claim 1 further comprising, after the step of spirally winding said ribbon, the additional steps of:

inserting a cylindrical member into the internal bore of said cylindrical body and compressing said cylindrical body radially inwardly at its slots thereby conforming the internal bore to the cylindrical member.

3. A method of making a wound armature core structure having evenly spaced teeth, said core being adapted for use in a rotary electric machine, the method comprising the steps of:

forming in an elongated metal strip a plurality of evenly spaced teeth along one edge of said strip and a plurality of equally spaced indentations along the other edge of said strip, forming in an edge of each of said teeth a groove of a predetermined length, each groove extending along the longitudinal axis of its respective tooth, spirally winding said strip to form a generally cylindrical laminated body wherein said teeth extend radially outwardly and are spaced by slots and wherein said other edge defines an internal bore for receiving a shaft, and spreading each of the U-shaped grooves such that the portions of each tooth separated by a groove extend in opposite directions substantially transversely to the longitudinal axis of the respective tooth to thereby form an arcuate shoe, the shoes formed by the spreading step extending along the periphery of said cylindrical body.

4. A method of making a wound armature core structure according to Claim 3 further comprising, after the step of spirally winding said strip, the additional steps of:

inserting a cylindrical member into the internal bore of said cylindrical body and compressing said cylindrical body radially inwardly at its slots thereby conforming the internal bore to the cylindrical member.

5. A method of making a wound armature core structure having evenly spaced teeth, said core being adapted for use in a rotary electric machine, the method comprising the steps of:

continuously forming in an elongated metal strip (1) a plurality of evenly spaced teeth along one edge of said strip, each of the teeth having a groove of a predetermined depth extending from an edge thereof along the longitudinal axis of the respective tooth, and (2) a plurality of equally spaced indentations along the other edge of said strip, spirally winding and cutting said strip to form a generally cylindrical laminated body wherein said teeth extend radially outwardly and are spaced by slots and wherein said other edge defines an internal bore for receiving a shaft, and spreading each of the U-shaped grooves such that the portions of each tooth spearated by a groove extend in opposite directions substantially transversely to the longitudinal axis of the respective tooth to thereby form an arcuate shoe, the shoes formed by the spreading step extending along the periphery of said cylindrical body.

6. A method of making a wound armature core structure having evenly spaced teeth, said core being adapted for use in a rotary electric machine, the method comprising the steps of:

forming a plurality of slots at equal intervals along an edge of an elongated metal strip, said slots extending in a direction transverse to the longitudinal axis of the strip to thereby define said teeth, forming a U-shaped groove of a predetermined length at a free end of each of said teeth, each groove extending along the longitudinal axis of its respective tooth, spirally winding said strip to form a generally cylindrical laminated body having an internal bore, said teeth extending radially from said body, and spreading each of the U-shaped grooves such that the portions of each tooth separated by a groove extend in opposite directions substantially transversely to the longitudinal axis of the respective tooth to thereby form an arcuate shoe.

* * * * *